United States Patent [19]

Pomies

[11] Patent Number: 4,898,219

[45] Date of Patent: Feb. 6, 1990

[54] WORKING HEAD FOR A TREE-SHAPING MACHINE

[75] Inventor: Jean-Pierre Pomies, Montargis, France

[73] Assignee: Association pour la Rationalisation et la Mecanisation de l'Exploitation Forestiere - A.R.M.E.F., Paris, France

[21] Appl. No.: 291,519

[22] Filed: Dec. 29, 1988

[30] Foreign Application Priority Data

Dec. 31, 1987 [FR] France ................. 87 18480

[51] Int. Cl.$^4$ ............................. A01G 23/02
[52] U.S. Cl. .................... 144/2 Z; 144/343; 173/8
[58] Field of Search ........ 144/2 Z, 3 D, 343; 173/8, 9

[56] References Cited

U.S. PATENT DOCUMENTS

| | | | |
|---|---|---|---|
| 3,596,690 | 8/1971 | Hamilton et al. | 144/2 Z |
| 3,606,915 | 9/1971 | Lindblom | 144/2 Z |
| 3,690,351 | 9/1972 | Strickland et al. | 144/2 Z |
| 3,797,539 | 3/1974 | Moser et al. | 144/2 Z |
| 3,938,566 | 2/1976 | Penfold et al. | 144/2 Z |
| 4,039,010 | 8/1977 | Tucek | 144/2 Z |
| 4,440,236 | 4/1984 | Shiihara et al. | 173/8 |

FOREIGN PATENT DOCUMENTS

| | | |
|---|---|---|
| 910770 | 9/1972 | Canada . |
| 3112573-A1 | of 0000 | Fed. Rep. of Germany . |
| 512067 | 6/1976 | U.S.S.R. ............... 144/2 Z |
| 1139904 | 2/1985 | U.S.S.R. ............... 144/2 Z |

*Primary Examiner*—W. Donald Bray
*Attorney, Agent, or Firm*—Charles Fallow; Martin Hoffman

[57] ABSTRACT

A working head for a tree-shaping machine comprises drive means and at least one shaping unit comprising at least one mobile blade and an actuating jack (8, 9) for applying the blade to the surface of a tree. The pressure in the jacks is cancelled during the starting phase of the drive means.

8 Claims, 1 Drawing Sheet

WORKING HEAD FOR A TREE-SHAPING MACHINE

BACKGROUND OF THE INVENTION

This invention relates to a working head for a tree-shaping machine, and more particularly such a working head comprising drive means and at least one shaping unit, comprising at least one mobile blade and an actuating cylinder for applying said blade to the surface of a tree.

Such heads, which can generally also serve for felling trees and in which the drive means consist of two rollers which are placed on both sides of the trunk of the tree, are already known. Cylinders make it possible to press the rollers against the trunk so that, when the rollers are rotated, they drive the tree in a longitudinal movement.

During this movement, the blades which are themselves pressed against the trunk by their actuating cylinder cause the lopping while assuring guiding of the tree to be shaped.

Although operating correctly, this equipment exhibits the drawback of requiring great expenditures of hydraulic energy, in particular in the phases of starting and acceleration of the tree to be shaped.

SUMMARY OF THE INVENTION

This invention aims at remedying this drawback by providing a shaping head whose energy consumption is reduced in relation to that of conventional heads.

For this purpose, the invention has as its object a working head for a tree-shaping machine comprising drive means and at least one shaping unit, each placed on one of the sides of the drive rollers and comprising at least one mobile blade and an actuating cylinder for applying said blade to the surface of a tree, characterized in that it comprise means for cancelling the pressure in said cylinders during the phase of starting said drive means.

Such an arrangement makes it possible practically to cancel the friction of the blades on the trunk of the tree at the time of the starting of the drive means, i.e., when the inertia stresses are greatest since it is a matter of putting the tree to be shaped into movement.

The period during which this pressure is cancelled can be adjusted with the assistance of a timer with a value that is low enough, since the blades must assure guiding of the trunk almost instantaneously after starting the drive means.

In a particular embodiment comprising two shaping units placed on both sides of the drive means, each of the shaping units possessing mobile blades and stationary blades, the working head according to the invention comprises means for blocking the hydraulic fluid on the cylinder of the shaping unit upstream in relation to the direction of movement of the tree during shaping, during the acceleration phase of said drive means.

Actually, when the shaping head is in the lopping position, the mobile blades are placed under the trunk of the tree and apply it to the stationary blades placed above the trunk. During the acceleration phase, a torque is produced which tends to open the mobile blade of the shaping unit upstream.

To limit the stresses necessary for compensating the friction of the blades, the pressure is limited in the cylinders to a relatively low value which would not be enough to prevent their opening during this phase. This drawback is avoided by blocking the hydraulic fluid, for example with the assistance of a controlled flap.

When the drive rollers operate in such a direction that the diameter of the trunk increases as it advances in the shaping head, too great a pressure is avoided in the actuating cylinders of the blades, by providing means for limiting the value of the pressure in these jacks, for example a valve placed between the cylinder and said flap.

BRIEF DESCRIPTION OF THE DRAWINGS

As a nonlimiting example, a particular embodiment of the invention will now be described in reference to the accompanying diagrammatic drawings in which.

DESCRIPTION OF THE PREFERRED EMBODIMENT

Figure 1:
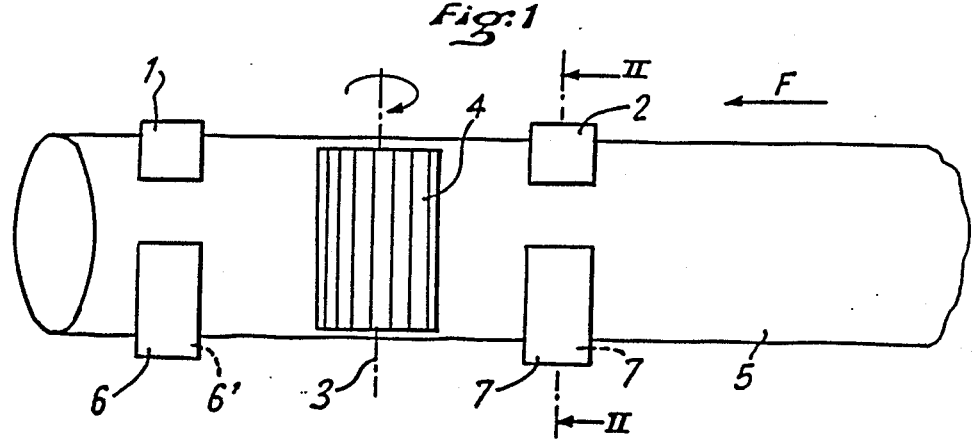
FIG. 1 is a very simplified side view of a shaping head according to the invention.
Figure 2:
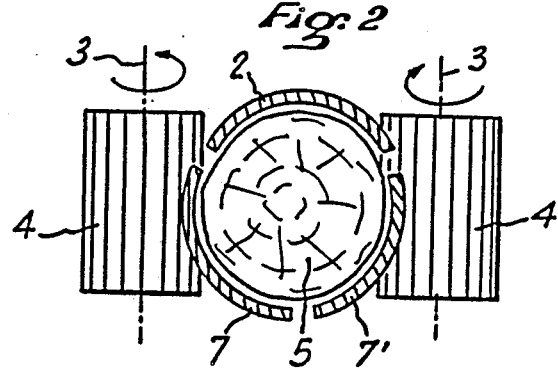
FIG. 2 is a view in section along line II—II of FIG. 1.
Figure 3:
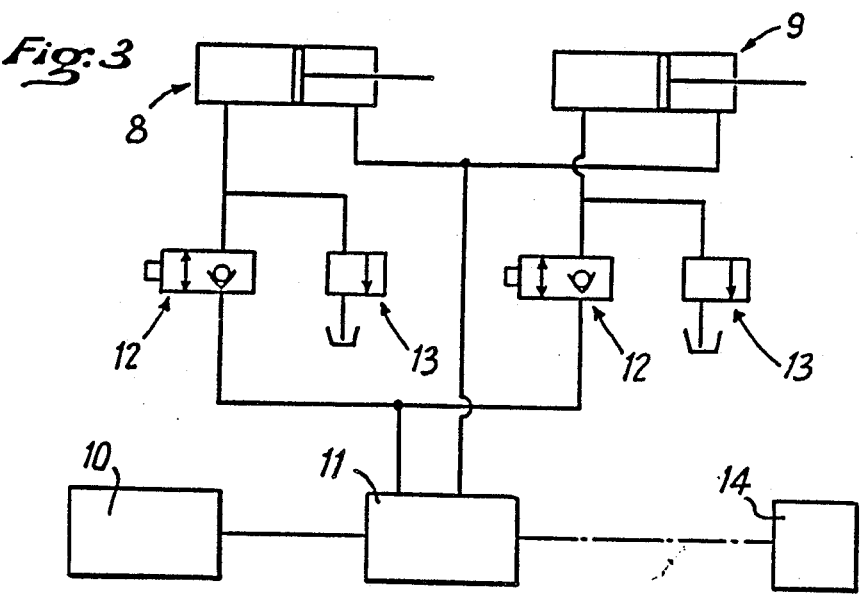
FIG. 3 is a hydraulic diagram of the shaping unit of this working head.

The working head shown in the drawing comprises a frame, not shown, on which are mounted, stationary, two upper lopping blades 1 and 2, as well as axes 3 of two drive rollers 4. Axes 3 are parallel to each other and perpendicular to the longitudinal direction of the tree to be shaped. Hydraulic cylinders make it possible to press two rollers 4 in the direction of one another so as to encircle a tree trunk 5. Hydraulic motors make possible the rotation of rollers 4 so as to drive tree 5 in the direction of arrow F, or in the reverse direction.

Each shaping unit placed on both sides of the drive rollers 4 comprises, besides its stationary blade, two mobile blades 6 and 6' for one of the shaping units, and two blades 7 and 7' for the other unit.

A cylinder 8 is provided for blades 6 and 6' for making possible engaging trunk 5 in the shaping head, and for closing them against this trunk.

Likewise, a cylinder 9 makes possible the opening and closing of blades 7 and 7'.

Cylinders 8 and 9 are fed from a pump 10 by a distributor 11.

The large chambers of cylinders 8 and 9 are fed by electrically controlled check valves or flaps 12. Further, relief valves 13 are placed between these flaps and the cylinders.

A timer 14 connected to the control of the drive motors of rollers 4 acts on distributor 11 to cancel the pressure in cylinders 8 and 9 during the starting phase of these motors, thus eliminating the friction and making it possible to reach the acceleration phase. This starting phase can, for example, last on the order of a half-second.

During the lopping, the pressure of feeding the cylinders is, for example, limited to 60 bars.

During the acceleration phase in the direction of arrow F, blades 7 and 7' are subjected to a vertical stress tending to open them. Said pressure of 60 bars not being enough to keep the blades closed, flap 12, corresponding to the cylinders of blades 7, blocks the hydraulic fluid contained in the cylinders and prevents the opening of the blades.

During an acceleration phase in the reverse direction, the same holds true for blades 6 and 6'.

During operation at a constant speed, the pressure of 60 bars in the two cylinders 8 and 9 makes it possible to maintain the contact of the tree on the blades.

When the direction of the advance of the tree is such that the diameter of the trunk grows as it passes, the pressure in the cylinders is limited by the two valves 13.

Diverse variants and modifications can, of course, be provided to the above description without thereby going outside either the scope or the spirit of the invention.

Thus the timer can be replaced by the detection of the actual starting of the drive devices.

Likewise, the rollers described can be replaced by rollers with inclined axes or endless belts.

I claim:

1. In a working head for a tree-shaping machine including at least one shaping unit having at least one movably mounted blade and an actuating cylinder for applying said movable blade to the surface of the work, and means for driving work through the shaping unit, the improvement comprising
    means for relieving the pressure in said cylinder during a starting phase of said driving means.

2. The invention of claim 1, comprising two of said shaping units, one positioned upstream of said driving means, and one positioned downstream thereof, and further comprising means for blocking flow of hydraulic fluid to the cylinder of the upstream shaping unit during an acceleration phase of said driving means.

3. The invention of claim 2, wherein said fluid blocking means comprises an electrically controlled valve.

4. The invention of claim 1, 2, or 3, further comprising means for limiting the pressure in said jacks during an increase in diameter of the tree during shaping.

5. The invention of claim 1, comprising at least two of said work driving means.

6. The invention of claim 5, comprising two of said shaping units, positioned on opposite sides of said driving means, and further comprising means for blocking flow of hydraulic fluid to the cylinder of the upstream shaping unit during an acceleration phase of said driving means.

7. The invention of claim 6, wherein said fluid blocking means comprises an electrically controlled valve.

8. The invention of claim 5, 6 or 7, further comprising means for limiting the pressure in said jacks during an increase in diameter of the tree during shaping.

* * * * *